(12) United States Patent
Darroman

(10) Patent No.: US 7,142,102 B2
(45) Date of Patent: Nov. 28, 2006

(54) WEIGHT OVERLOAD WARNING SYSTEM

(75) Inventor: Yann Darroman, Valls (ES)

(73) Assignee: Lear Corporation, Southfield, MI (US)

( * ) Notice: Subject to any disclaimer, the term of this patent is extended or adjusted under 35 U.S.C. 154(b) by 270 days.

(21) Appl. No.: 10/904,376

(22) Filed: Nov. 7, 2004

(65) Prior Publication Data

US 2006/0109099 A1    May 25, 2006

(51) Int. Cl.
*B60C 23/60* (2006.01)
*B60C 23/02* (2006.01)

(52) U.S. Cl. .................. 340/443; 340/440; 340/442; 73/146

(58) Field of Classification Search ............... 340/438, 340/442, 443; 73/146; 116/34 R, 34 A, 116/34 B
See application file for complete search history.

(56) References Cited

U.S. PATENT DOCUMENTS

| | | | |
|---|---|---|---|
| 5,583,765 A | 12/1996 | Kleehammer | 364/423.098 |
| 5,696,681 A * | 12/1997 | Hrovat et al. | 340/443 |
| 5,822,224 A | 10/1998 | Nakanishi et al. | 364/567 |
| 5,844,474 A * | 12/1998 | Saling et al. | 340/440 |
| 5,880,409 A | 3/1999 | Hartman | 177/137 |
| 5,959,259 A | 9/1999 | Beshears et al. | 177/132 |
| 5,998,741 A | 12/1999 | Beshears et al. | 177/133 |
| 6,307,164 B1 * | 10/2001 | Campbell | 73/1.13 |
| 6,941,989 B1 * | 9/2005 | Grotendorst et al. | 73/146 |
| 2003/0154798 A1 | 8/2003 | Weyand et al. | 73/760 |

* cited by examiner

*Primary Examiner*—Jeffery Hofsass
*Assistant Examiner*—Samuel J. Walk
(74) *Attorney, Agent, or Firm*—Bruce E. Harang

(57) ABSTRACT

A system for determining if a motor vehicle is overloaded by utilizing the Tire Pressure Monitoring System and the Auto Leveling System installed on many vehicles, and optionally, also providing the proper tire pressure to provide a save driving condition for the motor vehicle.

12 Claims, 5 Drawing Sheets

WEIGHT OVERLOAD WARNING SYSTEM

BACKGROUND OF THE INVENTION

1. Field of the Invention

The present invention generally relates to a measurement methods and systems. More particularly, the present invention relates to systems and methods for measuring the weight of a vehicle and its load using the Tire Pressure Monitoring System and the Auto-Leveling Technology already installed on many vehicles.

2. Description of the Related Art

Tires are very important to vehicles as they cushion the vehicle over surface irregularities, provide sufficient traction for driving and braking, and provide adequate steering control and direction stability. However, the most important feature of tires is that they support the weight of the vehicle and its load. The overloading of a vehicle can cause instability and accident that is of concern in all vehicles and especially a concern in large commercial vehicles. Overloading of a vehicle of any kind puts massive strain on vehicle tires and makes it less stable, difficult to steer and takes longer to stop. Unfortunately, most weighing systems require the use of external hardware and data acquiring devices.

For example, U.S. Pat. No. 5,583,765 issued Dec. 10, 1996 to Kleehammer teaches a system and method of monitoring the load and emissions of a tractor/trailer rig remotely while it is moving.

U.S. Pat. No. 5,822,224 issued Oct. 13, 1998 to Nakanishi et al. teaches a load monitoring system for monitoring the loads of a plurality of dump trucks.

U.S. Pat. No. 5,880,409 issued Mar. 9, 1999 to Hartman teaches a vehicle weight sensor mounted within a trunnion shaft of a single point trunnion suspension system for use on trailers.

U.S. Pat. No. 5,959,259 issued Sept. 28, 1999 to Beshears et al teaches a system and method for determining the weight and speed of a vehicle as it passes over at least two separate spaced apart transducers mounted on a highway.

U.S. Pat. No. 5,998,741 issued Dec. 7, 1999 to Beshears et al teaches a system and method for determining the weight and speed of a vehicle as it passes over at least two separate spaced apart transducers mounted on a highway.

U.S. Patent Application Publication 2003/0154798 published Aug. 21, 2003 to Weyand et al. teaches a method of monitoring a vehicle's weight using add-on hardware comprising at least one weight sensor and at least one data processing unit.

Therefore, there continues to be a need to provide an efficient method of determining overloading of a vehicle that does not require the use of external scales. This is especially true of private vehicles which are seldom if ever taken to commercial scales to determine whether their load puts the vehicle in an overloaded condition.

DISCLOSURE OF THE INVENTION

The present invention provides advantages and alternatives over the prior art by providing a means of determining if a vehicle is overloaded without the need for the installation and expense of additional hardware.

According to a further aspect of the present invention, there is presented a method of determining a vehicle weight overload condition using the existing tire pressure monitoring system and the existing auto leveling system of a vehicle comprising: using said auto leveling system to determine the weight of the vehicle; and using said tire pressure monitoring system to determine an overload condition of the vehicle.

According to yet another aspect of the present invention there is presented a method of determining vehicle weight overload utilizing the vehicle's existing tire pressure monitoring system and existing load leveling suspension system comprising the steps of: a) starting the weight overload monitoring system; b) checking the motion of the vehicle; c) if the vehicle is not motionless, sending a warning signal to the driver and returning to step b); d) if the vehicle is motionless, checking the tire pressure monitoring system state; e) if the tire pressure monitoring system does not respond normally, identifying which portions of the tire pressure monitoring system are not responding normally and send a warning to the driver; f) if the tire pressure monitoring system does not respond normally, starting the load leveling suspension system; g) entering into memory the upper and lower limit of vertical positions of the suspension spring; h) calculating the vertical displacement of the suspension spring for an unloaded vehicle and the rigidity coefficient of the suspension spring; i) calculating the vertical displacement of the suspension spring for a loaded vehicle and the rigidity coefficient of the suspension spring; j) determining if the actual vertical displacement of the suspension spring; k) determining if the result of step j) is greater than the result of step h); l) if the result of step k) is no, sending a warning to the driver that the suspension is out of order and returning to step f; m) if the result of step k) is yes, determining if the result of step j) is greater than the result of step i); n) if the result of step m) is no, sending a warning to the driver that the vehicle is overloaded and returning to step f; o) if the result of step m) is yes, ending.

The present invention thus advantageously provides a means of warning the driver of a vehicle if the vehicle is overloaded and if the tires are over or under inflated without the need to have the vehicle weighed on a commercial vehicle scale as well as providing a method of continuous checking of the suspension system of the vehicle.

DESCRIPTION OF THE PREFERRED EMBODIMENTS OF THE INVENTION

Figure 1:
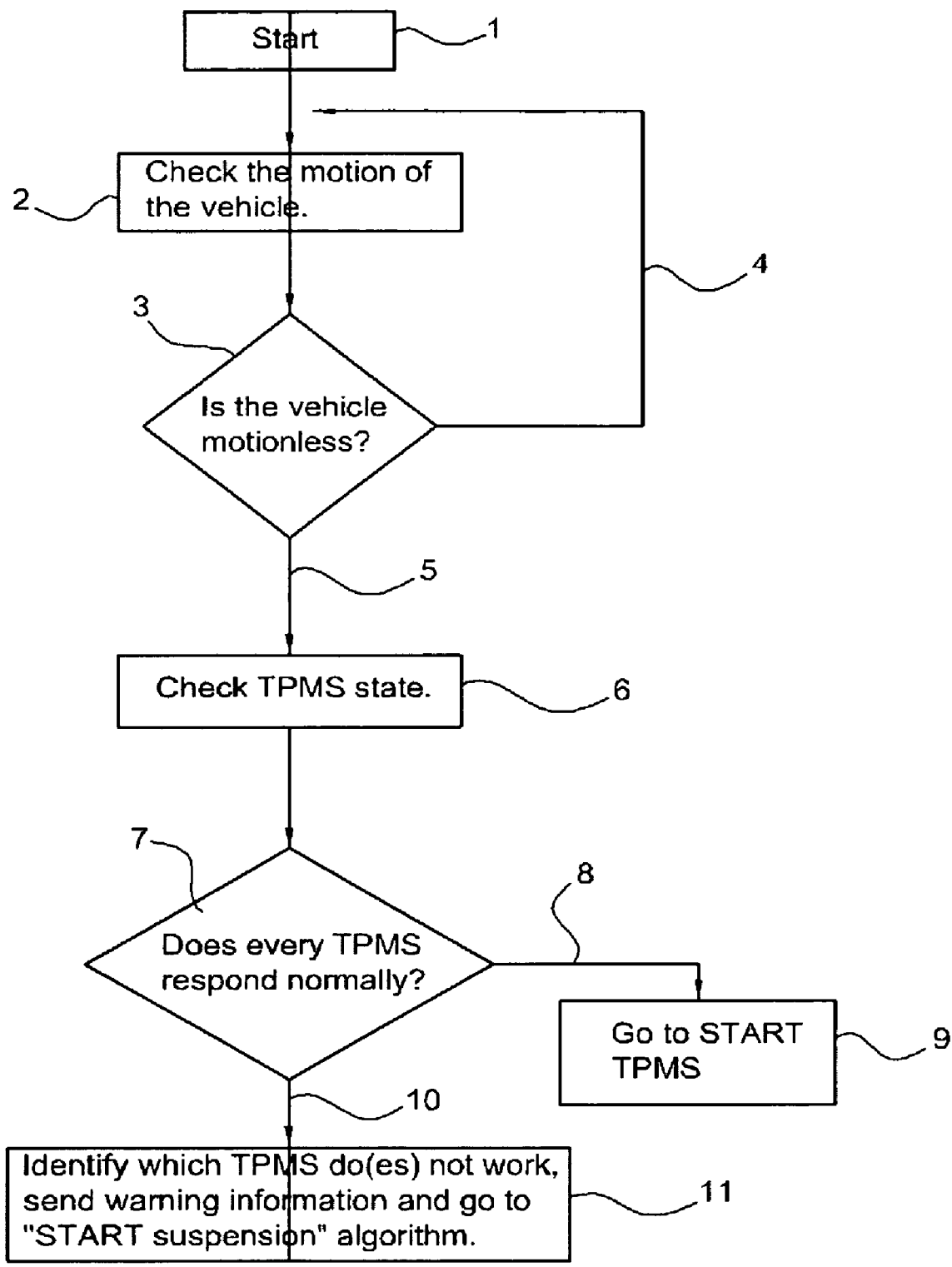
FIG. 1 shows a drawing of the control procedure algorithm for determining if the Tire Pressure Monitoring System (TPMS) is working or not.

Reference will now be made to the drawings, wherein to the extent possible like reference numerals are utilized to designate like components throughout the various views.

Referring to FIG. 1, which presents a drawing presenting a control procedure algorithm which is added to the onboard microprocessor to determine if the Tire Pressure Monitoring System (TPMS) system is working properly comprising the steps of starting the algorithm 1, checking the motion of the vehicle 2, determining if the vehicle is motionless 3, if No 4 then return to 2, if Yes 5 then proceed to check the Tire Pressure Monitoring System (TPMS) state 6, does the Tire Pressure Monitoring System (TPMS) respond normally 7, if Yes 8, go to the suspension algorithm 9, if No 10, identify which Tire Pressure Monitoring System (TPMS) does not work and START suspension algorithm 11.

Figure 2:
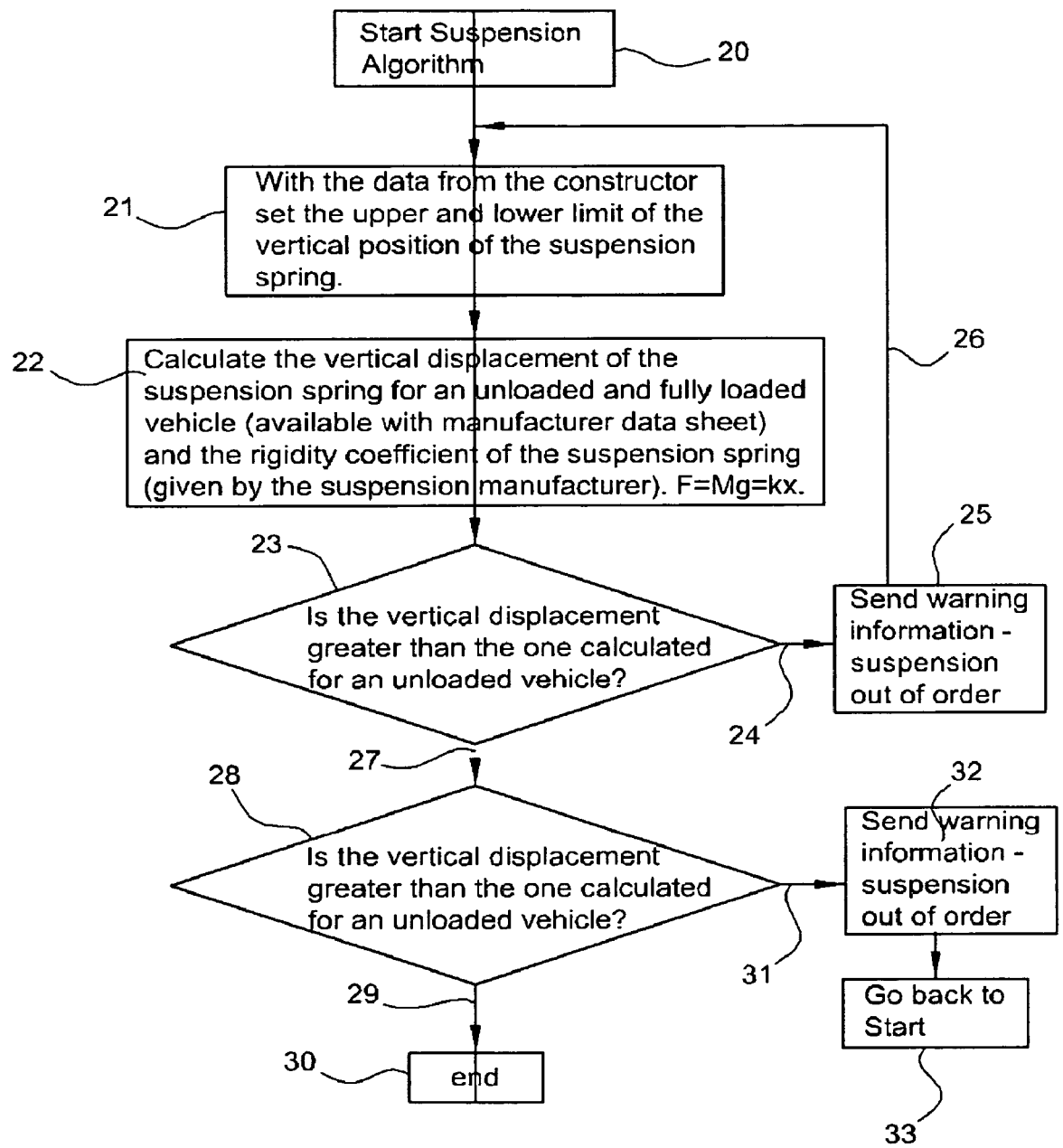
FIG. 2 shows a drawing of the control procedure algorithm to start the Auto-Leveling system control procedure if the Tire Pressure Monitoring System (TPMS) is found to be not working.

Referring now to FIG. 2, there is shown a drawing presenting the control procedure algorithm which is added to the onboard microprocessor to initiate the Auto-Leveling system method of determining if the vehicle is overloaded comprising the steps of starting the suspension algorithm 20, setting the manufacturers upper and lower limit of vertical position of the suspension spring 21, calculating the vertical displacement of the suspension spring for an unloaded, and for a fully loaded, vehicle and the rigidity coefficient of the suspension spring 22, determine if the current vertical displacement is greater than the one calculated for the unloaded vehicle 23, if NO send a warning that the suspension is out of order 25 back 26 to repeat step 21, if YES 27 then determine if the vertical displacement is greater than the one for a loaded vehicle, if NO 29 start TPMS 30, if YES 31 send warning that vehicle is overloaded 32 and go back to start 33.

Figure 3:
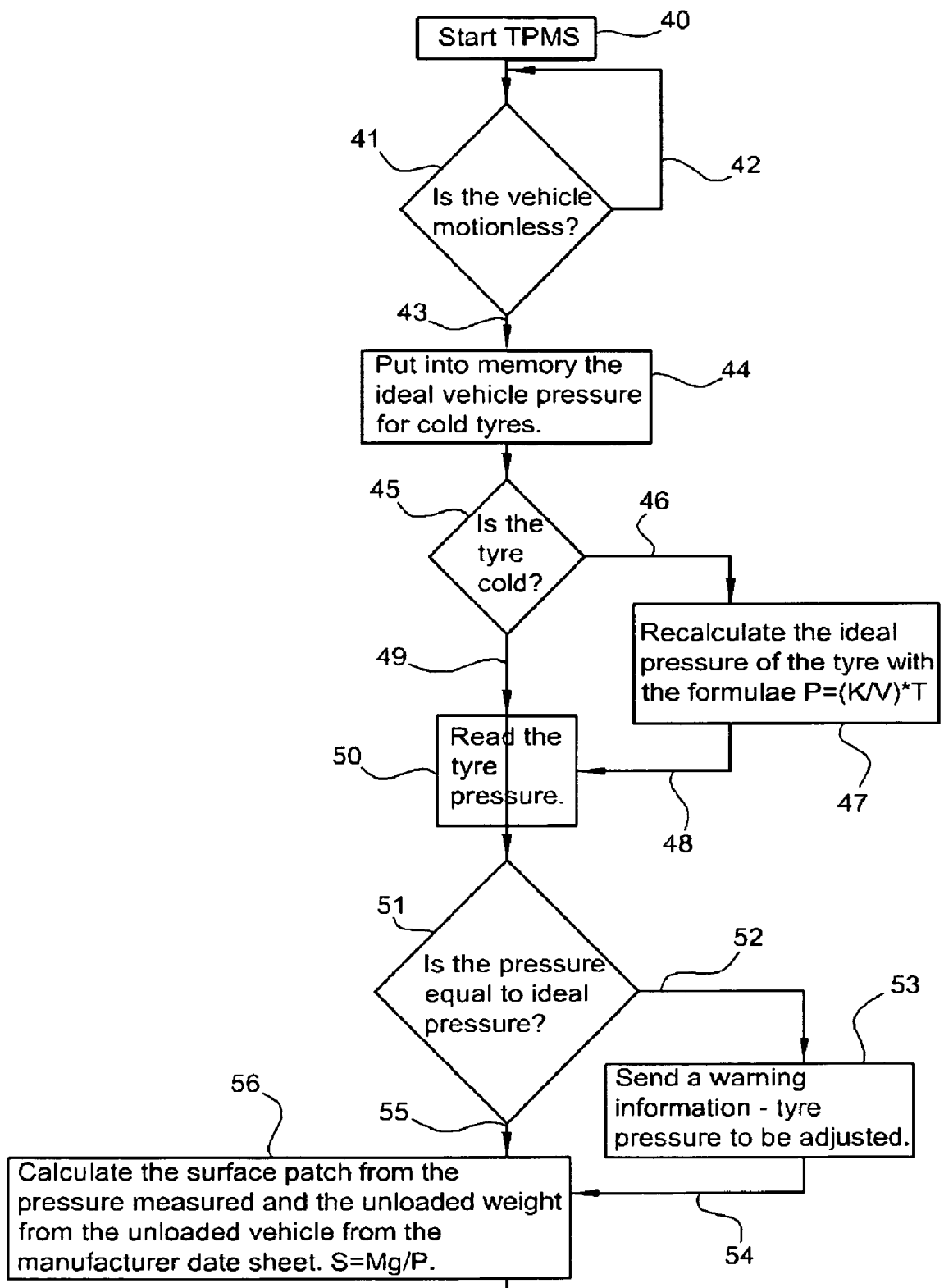
FIG. 3 shows a drawing of the first half of the control procedure algorithm allowing Tire Pressure Monitoring System (TPMS) to determine if the vehicle is overloaded.
Figure 4:
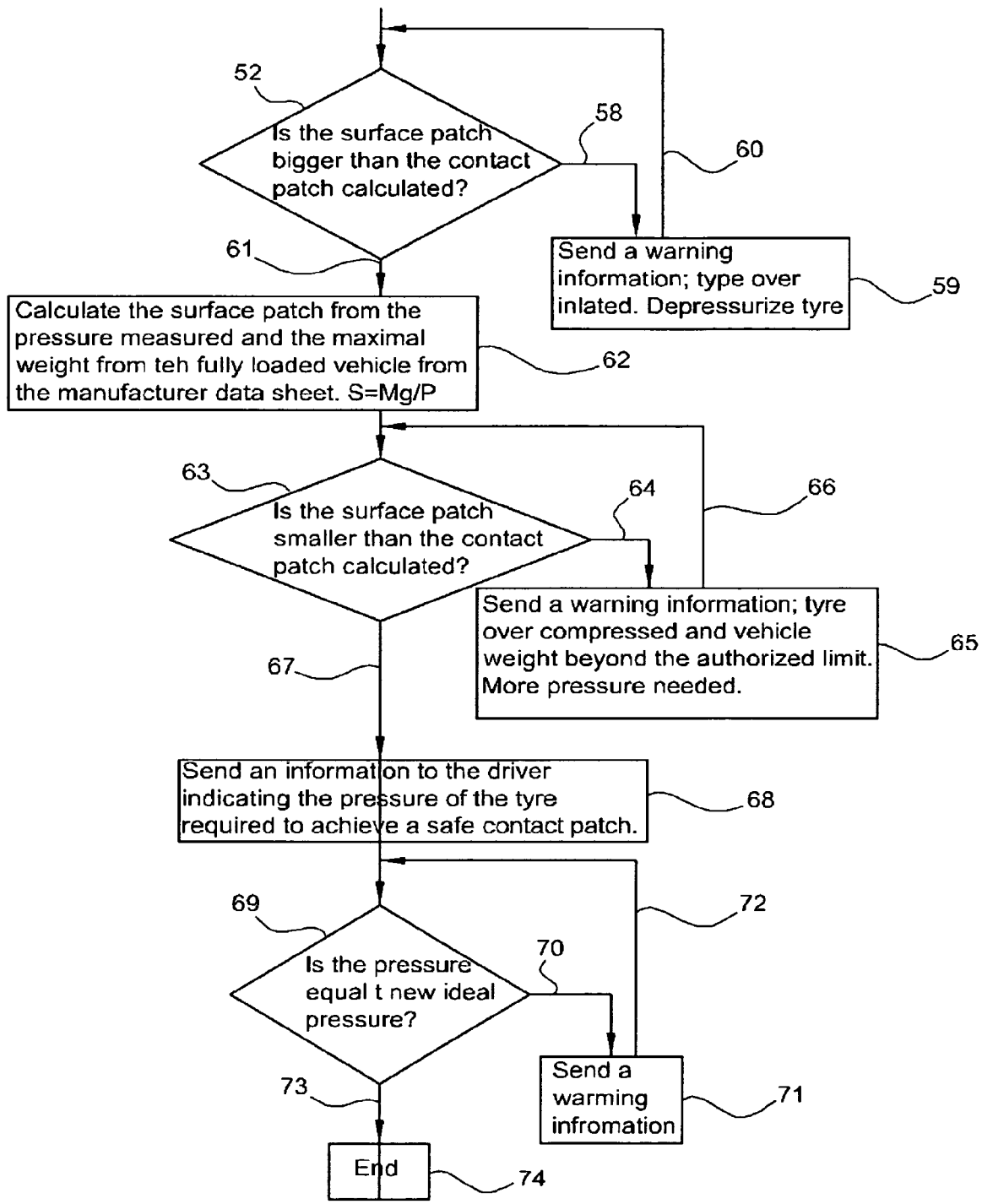
FIG. 4 show a drawing of the second half of the control procedure algorithm allowing Tire Pressure Monitoring System (TPMS) to determine if the vehicle is overloaded.

Turning now to FIGS. 3 and 4, there is shown the first half of a control procedure for the Tire Pressure Monitoring System (TPMS) overload determination in FIG. 3 and the second half of the control procedure for Tire Pressure Monitoring System (TPMS) overload determination in FIG. 4. FIG. 3 shows the start of the Tire Pressure Monitoring System (TPMS) procedure 40, determine if the vehicle is motionless 41, if NO 42 repeat 41, if YES 43 load into memory the ideal vehicle pressure for cold tires 44, determine if tire is cold 45, if YES 49 determine the tire pressure 50, if NO 46 recalculate the ideal tire pressure for the temperature of the tires 47 and proceed to step 50, determine if tire pressure is equal to ideal tire pressure 51, if NO 52 send warning that tire pressure needs to be adjusted 53 then proceed 54 to step 56, if YES 55 calculate the surface patch 56. FIG. 4 shows the continuation of FIG. 3 where it is determined if the surface patch found in 56 is bigger than the contact patch calculated, if NO 58 send a warning that the tire is over inflated and required depressurization and return to 57, if YES 61 determine if the fully loaded vehicle surface patch 62, determine if the value found in 62 is smaller than the contact patch calculated 63, if NO 64 send a warning that the tire is over compressed and vehicle is overloaded 65 and return 66 to step 63, if YES 67, send information indicating the pressure of the tire required to achieve a safe contact patch 68, determine if the found pressure is equal to the new ideal pressure 69, if NO 70 send warning information 71 and return 72 to step 69, if YES end procedure.

Figure 5:
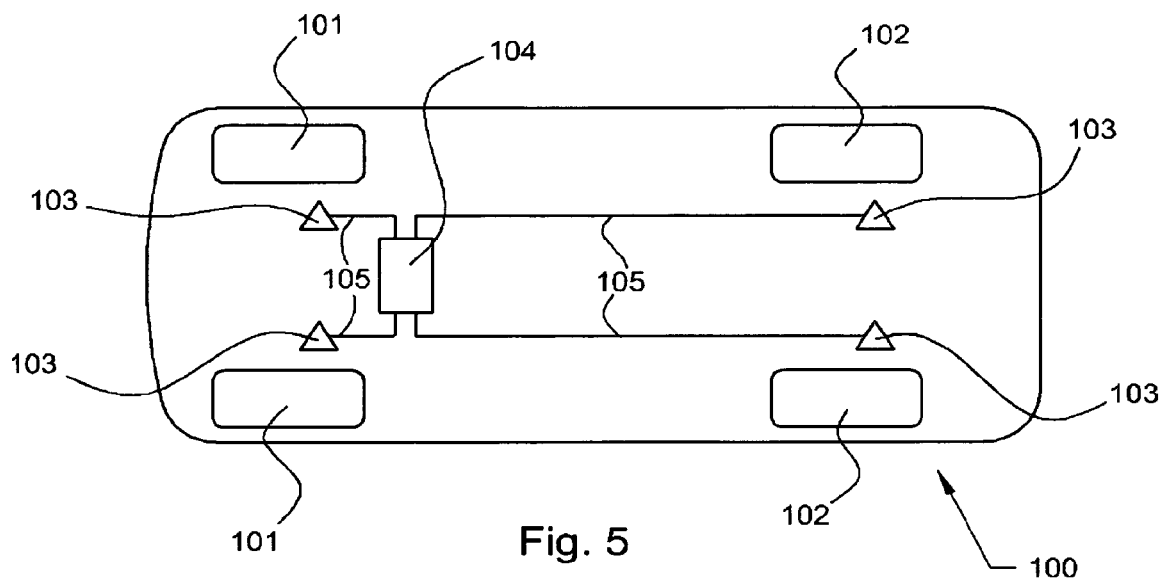
FIG. 5 shows a functional block diagram of a vehicle Tire Pressure Monitoring System (TPMS) showing the basic components

FIG. 5 shows a block diagram of a vehicle 100 having two front tires 101, two rear tires 102, and a spare tire 106, each tire having a Tire Pressure Monitoring System (TPMS) device 103 connected in working relationship therewith and each Tire Pressure Monitoring System (TPMS) device 103 further connected to a processor 104 via connection means 105.

Figure 6:
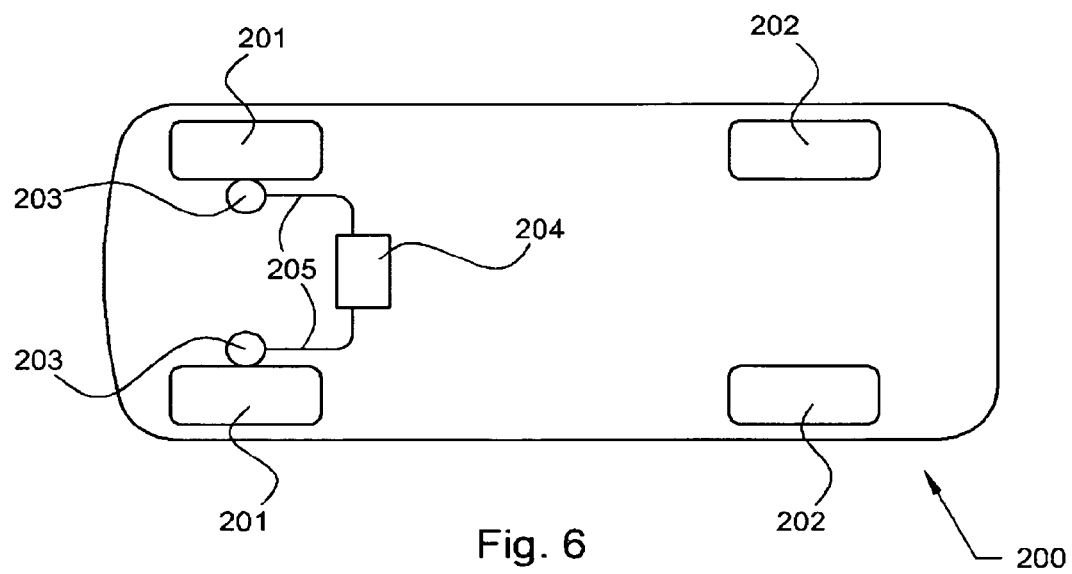
FIG. 6 shows a functional block diagram of a vehicle Auto-Leveling system showing the basic components.

FIG. 6 shows a block diagram of a vehicle 200 having two front tires 201, two rear tires 202 and a spare tire 206, each front tire 201 having a load leveling sensor device 203 operably connected thereto and further operably connected to a processor 204 by connecting means 205.

In practice the present invention makes use of the known relationship associating pressure with weight. The formulae associating pressure with weight are defined as:

$$\text{Pressure} = \frac{\text{Force}}{\text{Surface}} = \frac{\text{Weight\_applied\_on\_a\_tire} \times \text{Gravity}}{\text{patchsurface}}$$

If the pressure is constant therefore the heavier the vehicle, the larger the contact patch is. That gives the limit of the patch surface. The latter must be between the range:

$$\text{Contactpatch}_{fully\_loaded} > \text{Contactpatch}_{vehicle} > \text{Contactpatch}_{unloaded}$$

If the fully loaded contact patch is bigger than the contact patch when the vehicle is unloaded the vehicle is overloaded and a warning signal needs generating both for informing that the vehicle is overloaded and that the tire needs more pressure to exhibit a safe contact patch.

If the fully loaded contact patch is smaller than the contact patch when the vehicle is unloaded, the tire is over inflated and tire pressure needs lowering.

In addition, the Tire Pressure Monitoring System (TPMS) system provides a tire pressure in terms of temperature and manufacturer provides pressure limits based on an unloaded tire at 25 degrees Kelvin, so the change in pressure due to change in temperature must also be calculated according to the formulae:

$$P = \frac{nR}{\text{Pneumatic\_Volume}} \times T$$

Where n represents the number of molecules of air inside the tire and R the Boltzman constant, n and R are constant therefore the only way the pressure can vary is due to the change in temperature because the tire volume stays constant as well.

However, since the pressure of the tire at a given temperature is the same whether it is under load or unloaded a method of determining the vehicle weight is needed. This can be determined in vehicles with Auto Leveling Technology which can be used as a means of determining the vehicles weight for use by the Tire Pressure Monitoring System (TPMS) system.

Thus the Auto-Leveling system can make use of the known relationship associating weight with the displacement of a classical spring. Suspension can be assumed to have approximately the same equations as a classical spring $$\text{Force} = K \times x = Mg$$

Where K is the rigidity coefficient of a spring and x is the displacement of the spring. Therefore, when unloaded:

$$x = \frac{Mg}{K}$$

Thus, the displacement of the spring is directly proportional to the weight of the vehicle.

As for the Tire Pressure Monitoring System (TPMS) technology, upper and lower weight limits give the range of vertical position allowed. The measurement is taken while the vehicle is motionless. If the weight of the vehicle goes beyond the limit, the springs will be compressed beyond the set limit and the displacement will be too deep. When this happens a warning signal is generated to inform the driver about the dangerous condition. In another preferred embodiment of the present invention, the warning signal also indicates the correct tire pressure for each tire for both over inflated and under inflated tire conditions.

In order for the Auto-Leveling Technology overload system to work properly the suspension must be re-calibrated periodically to compensate for the spring rigidity coefficient changes with aging of the spring.

Although the preferred embodiments of the present invention has been disclosed, various changes and modifications may be made without departing from the scope of the invention as set forth in the appended claims.

What is claimed is:

1. A method of determining a motor vehicle weight overload condition using an existing tire pressure monitoring system and an existing auto leveling system of a vehicle comprising:
   using said auto leveling system to determine the weight of the vehicle; and
   also using said tire pressure monitoring system to determine an overload condition of the vehicle.

2. A method as claimed in claim 1 wherein, upon a determination of a vehicle overload condition a warning signal is sent to the vehicle operator.

3. A method as claimed in claim 2 wherein, said warning signal further indicates the amount of pressure needed in each tire to overcome the overload condition.

4. A method as claimed in claim 1 wherein, upon a determination of a vehicle having over-inflated tires a warning signal is sent to the vehicle operator.

5. A method as claimed in claim 4 wherein, said warning signal further indicates the amount of pressure needed to bring each tire to the proper operating pressure.

6. A method as claimed in claim 1 wherein, said tire pressure monitoring and said auto leveling system monitors the two front tires and two rear tires.

7. A method as claimed in claim 1 wherein, said auto leveling systems monitors the two rear tires.

8. A method as claimed in claim 1 wherein, said auto leveling systems monitors the two front tires.

9. A method as claimed in claim 1 wherein, said tire pressure monitoring system monitors the two front tires, the two rear tires, and the spare tire.

10. A method as claimed in claim 1 wherein, a failure of said tire pressure monitoring system causes a warning signal of said failure to be sent to the vehicle operator.

11. A method as claimed in claim 8 wherein, said failure of said tire pressure monitoring system causes the auto leveling system weight determination algorithm to be activated.

12. A method of determining motor vehicle weight overload utilizing the motor vehicle's existing tire pressure monitoring system and existing load leveling suspension system comprising the steps of:
   a) starting the weight overload monitoring system;
   b) checking the motion of the vehicle;
   c) if the vehicle is not motionless, sending a warning signal to the driver and returning to step b);
   d) if the vehicle is motionless, checking the tire pressure monitoring system state;
   e) if the tire pressure monitoring system does not respond normally, identifying which portions of the tire pressure monitoring system are not responding normally and send a warning to the driver;
   f) if the tire pressure monitoring system does not respond normally, starting the load leveling suspension system;
   g) entering into memory the upper and lower limit of vertical positions of the suspension spring;
   h) calculating the vertical displacement of the suspension spring for an unloaded vehicle and the rigidity coefficient of the suspension spring;
   i) calculating the vertical displacement of the suspension spring for a loaded vehicle and the rigidity coefficient of the suspension spring;
   j) determining if the actual vertical displacement of the suspension spring;
   k) determining if the result of step j) is greater than the result of step h);
   l) if the result of step k) is no, sending a warning to the driver that the suspension is out of order and returning to step f;
   m) if the result of step k) is yes, determining if the result of step j) is greater than the result of step i);
   n) if the result of step m) is no, sending a warning to the driver that the vehicle is overloaded and returning to step f;
   o) if the result of step m) is yes, ending.

* * * * *